US008381036B2

(12) United States Patent
Vidal et al.

(10) Patent No.: US 8,381,036 B2
(45) Date of Patent: Feb. 19, 2013

(54) SYSTEMS AND METHODS FOR RESTORING MACHINE STATE HISTORY RELATED TO DETECTED FAULTS IN PACKAGE UPDATE PROCESS

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 70 days.

(21) Appl. No.: 12/788,036

(22) Filed: May 26, 2010

(65) Prior Publication Data
US 2011/0296248 A1  Dec. 1, 2011

(51) Int. Cl.
G06F 11/36 (2006.01)
G06F 11/00 (2006.01)

(52) U.S. Cl. .............. 714/38.1; 714/25; 714/26; 714/49

(58) Field of Classification Search ............ 714/25, 714/26, 27, 37, 38.1, 38.14, 46, 49, 57, 51; 717/168
See application file for complete search history.

(56) References Cited

U.S. PATENT DOCUMENTS

| | | | |
|---|---|---|---|
| 6,438,749 B1 | 8/2002 | Chamberlain | |
| 6,763,403 B2 * | 7/2004 | Cheng et al. ................... | 714/25 |
| 7,240,336 B1 | 7/2007 | Baker | |
| 7,512,939 B2 | 3/2009 | Brookner | |
| 7,546,595 B1 * | 6/2009 | Wickham et al. ............. | 717/168 |
| 7,624,393 B2 | 11/2009 | Egan et al. | |
| 7,657,885 B2 | 2/2010 | Anderson | |
| 7,836,341 B1 | 11/2010 | Krishnan | |
| 2003/0051235 A1 | 3/2003 | Simpson | |
| 2003/0229890 A1 | 12/2003 | Lau et al. | |
| 2005/0091288 A1 * | 4/2005 | Ji et al. ........................... | 707/200 |
| 2005/0210459 A1 | 9/2005 | Henderson et al. | |
| 2006/0190773 A1 | 8/2006 | Rao et al. | |
| 2006/0230398 A1 | 10/2006 | Yokota | |
| 2007/0038991 A1 | 2/2007 | Schuft et al. | |
| 2007/0157192 A1 | 7/2007 | Hoefler et al. | |
| 2007/0169075 A1 | 7/2007 | Lill et al. | |
| 2008/0134165 A1 | 6/2008 | Anderson et al. | |
| 2008/0141240 A1 | 6/2008 | Uthe | |
| 2008/0201705 A1 | 8/2008 | Wookey | |
| 2009/0013319 A1 | 1/2009 | Williams et al. | |

(Continued)

OTHER PUBLICATIONS

Seth Kelby Vidal, "Systems and Methods for Initiating Software Repairs in Conjuction With Software Package Updates", U.S. Appl. No. 12/714,200, filed Feb. 26, 2010.

(Continued)

Primary Examiner — Joseph D Manoskey
(74) Attorney, Agent, or Firm — Lowenstein Sandler PC

(57) ABSTRACT

Embodiments relate to systems and methods for storing machine state history related to detected faults in a package update process. A classification tool can interface with a data store that can store machine state data on a client. The classification tool can record an initial machine state on the client and initiate a package update on the client. The classification tool can further record an updated machine state of the client subsequent to initiating the package update and detect a fault condition in the client subsequent to initiating the package update. The classification tool can examine the initial machine state and the updated machine state to categorize one or more causes of the fault condition as either related to the package update or to systemic conditions of the client. The classification tool can further notify a user of the client of the one or more causes of the fault condition.

20 Claims, 5 Drawing Sheets

U.S. PATENT DOCUMENTS

| | | | |
|---|---|---|---|
| 2009/0037897 | A1 | 2/2009 | Dull et al. |
| 2009/0113248 | A1* | 4/2009 | Bock et al. ............ 714/39 |
| 2009/0300595 | A1 | 12/2009 | Moran et al. |
| 2010/0023933 | A1 | 1/2010 | Bryant et al. |
| 2010/0058308 | A1 | 3/2010 | Demshur et al. |
| 2010/0058314 | A1 | 3/2010 | Wang |
| 2010/0083243 | A1 | 4/2010 | Mincarelli et al. |

OTHER PUBLICATIONS

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages" U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

SYSTEMS AND METHODS FOR RESTORING MACHINE STATE HISTORY RELATED TO DETECTED FAULTS IN PACKAGE UPDATE PROCESS

FIELD

The present teachings relate to systems and methods for storing machine state history related to detected faults in a package update process, and more particularly, to platforms and techniques for conducting diagnostic inspections of client or target machines configured to receive a package update.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging or media applications. In instances, a software package can contain application software, operating system software, drivers, patches, and/or other software components grouped as a logical set. In implementations, the package can be stored or encoded as a single file or data object.

Software package update managers exist to help a user initiate and perform software package updates, such as, for example, the "yum" (Yellowdog update manager) package update manager available from Red Hat, Inc., Raleigh, N.C., and others. In general, available software package managers are configured to interact with the set of installed packages on a client and with one or more software package repositories, to directly connect to those databases and download available package updates.

The process of initiating software package updates can involve, however, the risk or possibility of software-related faults, instabilities, bugs, or other undesirable errors or conditions. A number of those potential faults or irregular conditions can have a tendency to occur during the window of time in which package updates are made. For example, a user who repeatedly downloads and installs updates for a variety of unrelated packages may incur the risk of overwriting copies of files with inconsistent or undesired versions of those files. Further, a user may choose to initiate a package update process without fully verifying or validating the source of the package update files, and retrieve and install those files without any virus scans, black-list check, or other security measures.

A user may also overlook an independent condition on the target machine or client that can cause a fault event during a package installation, and, therefore, be unable to discriminate between machine faults or crashes caused by the installation itself versus those that may be caused by separate application faults or other independent events. This can be especially true on machines that are executing a large number of applications or services at the time of the package update. Because existing package update managers are not configured to monitor machine state data before, during, and after a package installation, nor to differentiate between fault events induced by the package update event versus independent machine faults, those faults occurring around the time of package installation or update events can be difficult to debug, and may remain undiagnosed. It may be desirable to provide systems and methods for storing machine state history related to detected faults in the package update process, in which diagnostic logic and user notification can be integrated into the package update process to detect, diagnose, and correct potentially problematic updates and/or other system conditions associated with the package manager or the client, during or after the update activity takes place.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for storing a machine state history related to detected faults in a package update process. More particularly, embodiments relate to platforms and techniques for monitoring system conditions before, during and after the package update process, detecting conflicts, bugs, faults, and/or other undesired conditions that may arise during or surrounding the update process, and diagnosing one or more causes of the conflicts, bugs, faults, and/or other undesired conditions from the monitored system conditions. In embodiments, a package manager can track and manage the installation of one or more software packages and/or updates to those packages (that may be referred to together as a "software package update") on a client, host, target, and/or other machine. The package manager can host or interact with a classification tool containing logic, to trace the identities of the software package updates, to monitor client state conditions, and to communicate with a diagnostic database. The diagnostic database can contain information, links, and other data to flag or identify potential conflicts, bugs, faults, and/or other conditions based on the selected updates, the state of client resources, and/or other variables.

The classification tool can inspect, record, or diagnose any potential conflicts, bugs, faults, and/or other conditions, and causes thereof, and generate a notification to the user of those potential client or package installation issues. In embodiments, the notification can include an indication whether a machine fault was caused, was likely to be caused, or was not caused or was not likely to have been caused by the package installation activity of interest. In embodiments, a user can then confirm, discontinue, change, retry, or otherwise process a package update activity. For example, if the diagnostic result is that a package update failed due to a machine fault caused by conflicts in the file versions unpacked and installed from a package update, the user may be presented with options to un-install that package. Conversely, if the diagnostic result is that the machine fault was caused by a poorly behaved application that is independent of the package update, the user may be presented with options to retain that package update and proceed to debug the faulty application. These and other embodiments described herein address the various noted shortcomings in known package update technology, and provide a user with enhanced package and system management capability for installing their software package resources with less potential for software conflicts, errors, or other undesirable results of updating activity.

Reference will now be made in detail to exemplary embodiments of the present teachings, which are illustrated in the accompanying drawings. Where possible the same reference numbers will be used throughout the drawings to refer to the same or like parts.

Figure 1:
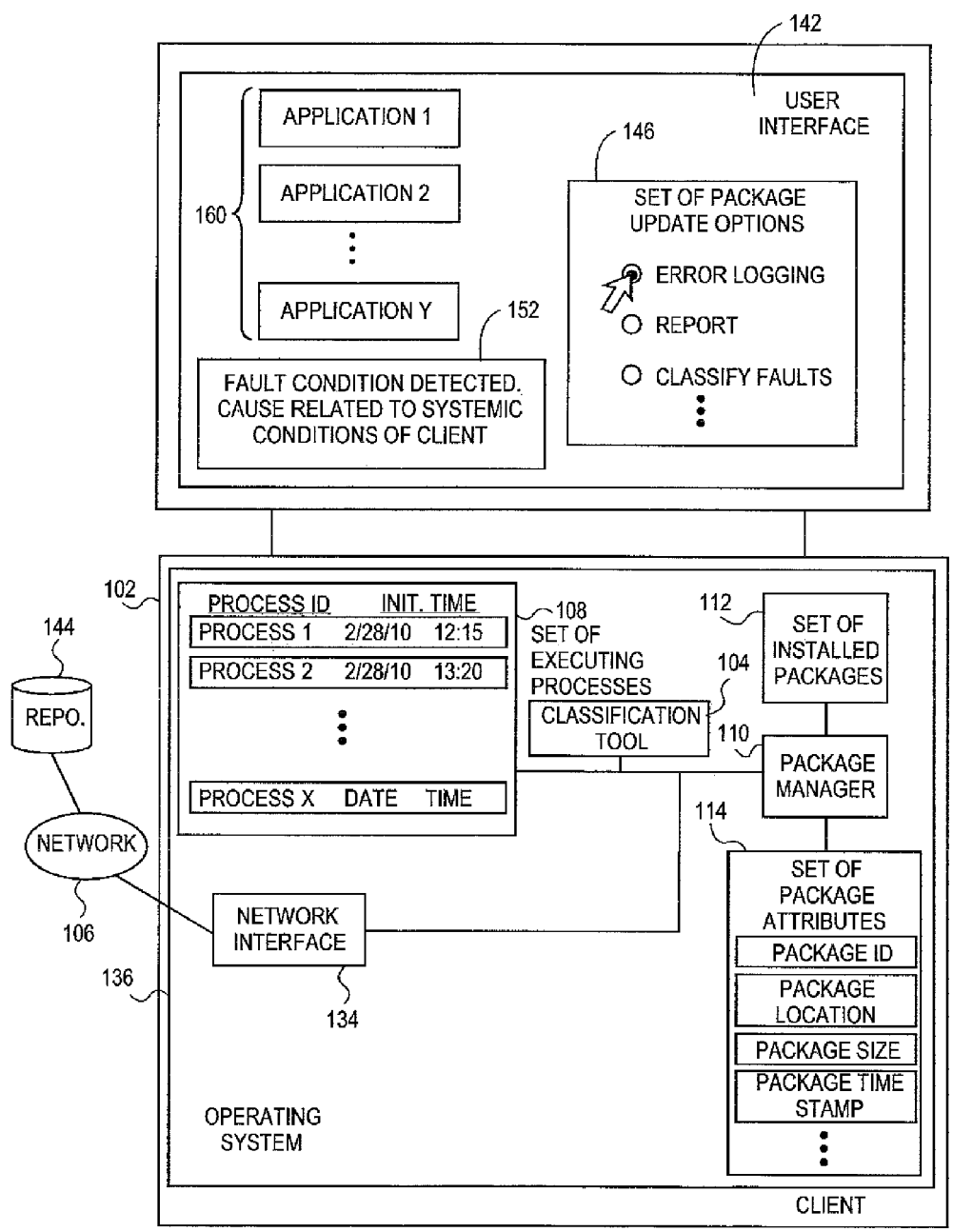
FIG. 1 illustrates an overall network in which systems and methods for storing machine state history related to detected faults in the package update process can be implemented, according to various embodiments.

FIG. 1 illustrates an exemplary system 100 in which systems and methods for storing machine state history related to detected faults in a package update process can be implemented. In embodiments as shown, a client 102 can store, execute, and otherwise host a variety of resources including a package manager 110 configured to communicate with a set of installed packages 112, and other hardware, software, and resources. In embodiments, package manager 110 can be or can include a software application, a utility, an application programming interface (API) to an operating system 136 of client 102, a service, and/or other local or remote logic or resources. According to embodiments, package manager 110 can access and manage set of installed packages 112 to run, edit, update, configure, and otherwise manage one or more software packages hosted or installed in client 102. In embodiments, package manager can be or can include one or more commercially and/or publicly available package manager applications or resources, such as the "yum" package update manager available from Red Hat Inc. based on or compatible with the Red Hat package manager (rpm) platform, or others.

In embodiments, set of installed software packages 112 can be or include packages comprising various types of applications 160, such as, for example, messaging applications, spreadsheet or modeling applications, social networking applications, word processing applications, and/or other applications or utilities, and can in embodiments include an operating system, drivers, and/or components. Set of installed packages 112 can have an associated set of package attributes 114 which can record file names, versions, dates, software requirements, and/or other attributes related to the software package updates installed on client 102 and reflected in set of installed software packages 112.

Package manager 110 can communicate with a network interface 134 configured to connect to one or more networks 106, such as the public Internet or other public or private networks. Package manager 110 can thereby connect to one or more package repositories 144 hosting software packages including software package updates, and/or other software or resources.

Package manager 110 can also interact and/or communicate with set of installed packages 112 and one or more package repositories 144 to initiate, configure, test, update, and/or otherwise manage set of installed packages 112 operating on client 102. Package manager 110 can, for example, provide a user with a set of package update options 146 displayed via user interface 142, such as a graphical user interface or others, to select various test, configuration, and/or other management activities on set of installed packages 112. For example, a user can select to initiate an update on one or more of set of installed packages 112 or install a new package update on client 102 via user interface 142.

in embodiments, package manager 110 can communicate with a classification tool 104 hosted on client 102, to actively monitor package installation and client 102, detect fault conditions or events on client 102 associated with a package installation, and determine one or more causes of the fault conditions based on the monitored history. In embodiments, classification tool 104 can isolate, discriminate, or otherwise categorize either the package installation or systemic conditions of client 102 as the one or more causes of the fault conditions. Further, classification tool 104 can generate reports and notifications regarding a fault condition status, one or more causes of the fault conditions and categories thereof, or other conditions of package update activities conducted on client 102. By determining the one or more causes of the fault conditions, a user can be notified of future potential faults or other conditions that might be caused by client system or software packages activity. Classification tool 104 can record diagnostic information such as, for example, the one or more causes of the fault conditions, origins of the one or more causes, and other data. Classification tool 104 can also contain or access diagnostic logic to examine data generated or hosted by various resources, including set of installed packages 112, operating system 136, or one or more repositories 144 to generate user notifications and other output to support and manage package updates and diagnostic activities, and client system activities.

Figure 2:
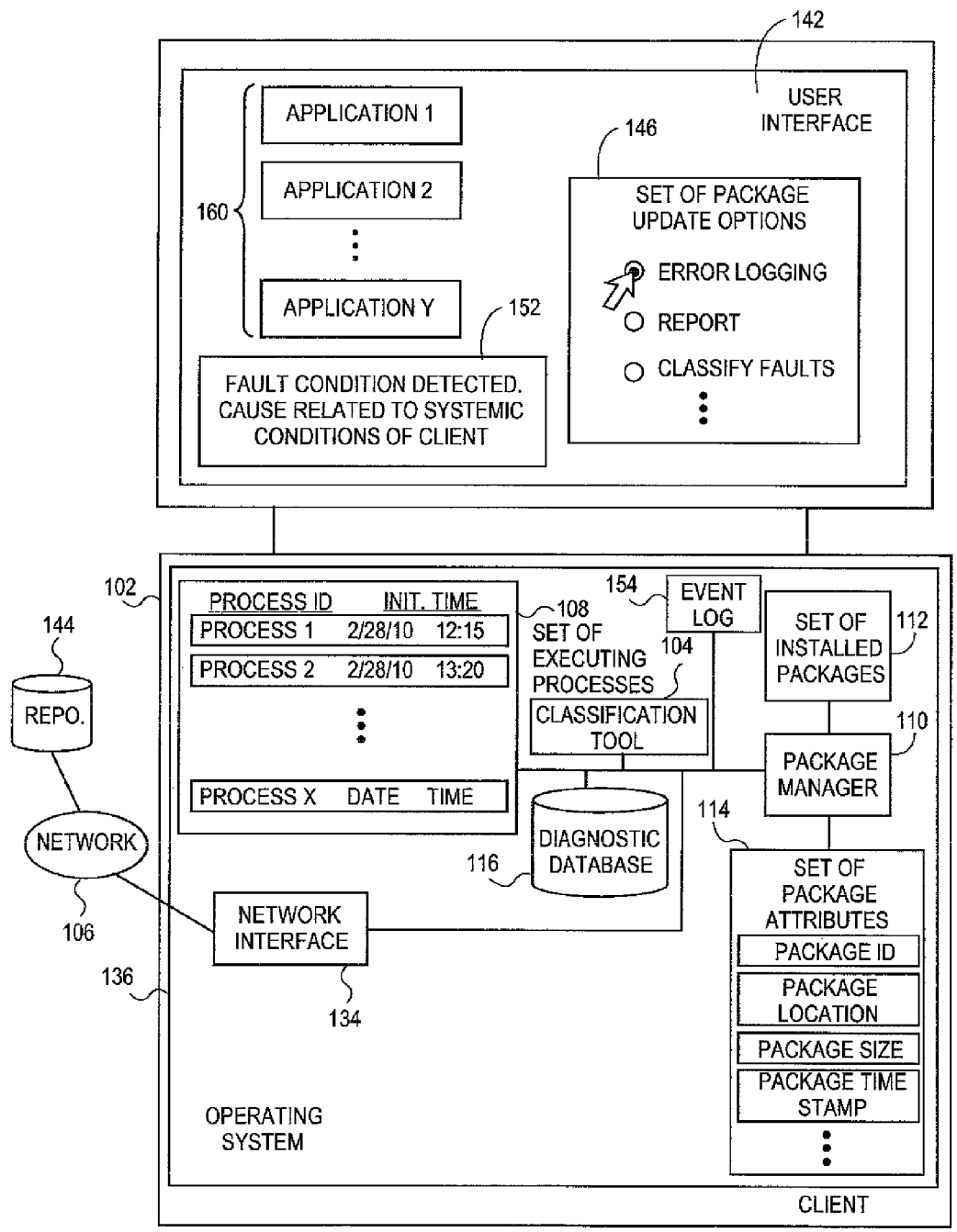
FIG. 2 illustrates an overall network in which systems and methods for storing machine state history related to detected faults in the package update process can be implemented, according to various embodiments in further regards.

As illustrated, for example, more particularly in FIG. 2, package manager 110 can connect to one or more package repositories 144 via one or more networks 106. Package manager 110 can present and manage set of update options 146 to initiate and conduct download activity, for example to initiate the download of one or more package updates. According to embodiments, classification tool 104 and/or other logic can record or monitor system activity of client 102 before, during, or after the installation of the one or more package updates. Classification tool 104 and/or other logic can, for example, analyze resources on client 102, such as, for example, a set of executing processes 108, executing threads, one or more open communication ports, one or more dependencies, one or more authorized users, one or more termination events, or any other conditions. In embodiments, classification tool 104 can maintain and/or access a diagnostic database 116 to store recorded or monitored system activity of client 102.

Classification tool 104 and/or other logic can monitor set of executing processes 108 or other resources on client 102 via operating system 136 and/or other resources, to identify one or more fault conditions on client 102, such as a conflict, hang, and/or other condition. In other embodiments, classification tool 104 and/or other logic can probe and identify fault conditions on client 102 either caused by the package installation or caused by systemic conditions on client 102 independent from the package installation, either during or after the package is installed on client 102. For example, classification tool 104 and/or other logic can detect a termination of one or more of the set of executing processes 108 on client 102 during a package installation. Classification tool 104 and/or other logic can create and/or maintain an event log 154 to store recorded fault conditions on client 102. For example, event log 154 or other records may indicate a termination of one or more processes caused during the installation of one or more package updates.

According to embodiments, classification tool 104 and/or other logic can examine the recorded or monitored system activity of client 102, such as data stored in diagnostic database 116, to determine one or more causes of the fault conditions, such as fault conditions recorded in event log 154. In embodiments, classification tool 104 and/or other logic can determine the one or more causes of the fault conditions by comparing the recorded system activity of client 102 before the installation of one or more package updates to the recorded system activity of client 102 during or after the installation of one or more package updates. For example, classification tool 104 can determine the one or more causes by comparing recorded data associated with set of executing processes 108, such as, for example, one or more executing threads, one or more executing processes, one or more open communication ports, one or more dependencies, one or more authorized users, one or more termination events or conditions thereof.

Classification tool 104 and/or other logic can isolate, discriminate, or otherwise categorize either the package installation or systemic conditions of client 102 as the one or more causes of the fault conditions. For example, an application executing on client 102 independent from the package installation can cause the fault conditions. Alternatively, a process initiated on the client 102 as a result of the package installation can cause the fault conditions. In embodiments, the classification tool 104 can examine dependencies as recorded and/or stored in the diagnostic database 116 to determine whether systemic conditions independent of the package installation caused the fault conditions, or whether processes or threads resulting from a package initiation or installation caused the fault conditions.

Classification tool 104 and/or other logic can provide one or more notifications 152 to users of client 102. For example, notification 152 can contain the one or more causes and/or the categories of the one or more causes of the fault conditions monitored on the client 102 determined by examining records in diagnostic database 116 and/or event log 154. Other types of conditions related to the state of client 102 and its resources, as well as set of installed packages 112 and other resources, can be identified and reported to the user via one or more notifications 152. According to other embodiments, classification tool 104 can identify and generate notifications automatically, and/or, can generate notification, repair, and/or other activity based on user configuration settings, such as selections to display or suppress the display of selected notifications, and/or to automatically perform selected repair actions or other processes, as described herein.

Classification tool 104 can generate one or more notifications 152 before, during, or after the installation of one or more package updates 150. When generating notifications, classification tool 104 can likewise access other data resources, such as diagnostic database 116, that can contain for example monitored or recorded system data. According to embodiments, classification tool 104 can utilize data stored in diagnostic database 116 and/or event log 154 for use during future package installations. For example, classification tool 104 can detect a process executing on client 102 that previously caused a fault condition during a package installation, and terminate that process on client 102 before a new package installation is initiated. It should be appreciated that other software repair actions are envisioned. For example, classification tool 104 and/or other logic can perform one software repair or correction, or can perform a series or sequences of repair actions or corrections. In embodiments where multiple corrections are performed, classification tool 104 and/or other logic can re-test client 102, set of installed packages 112, and/or resources of client 102 to determine the set of changes caused by the repair action, and possibly modify any additional repair actions that may be required.

Figure 3:
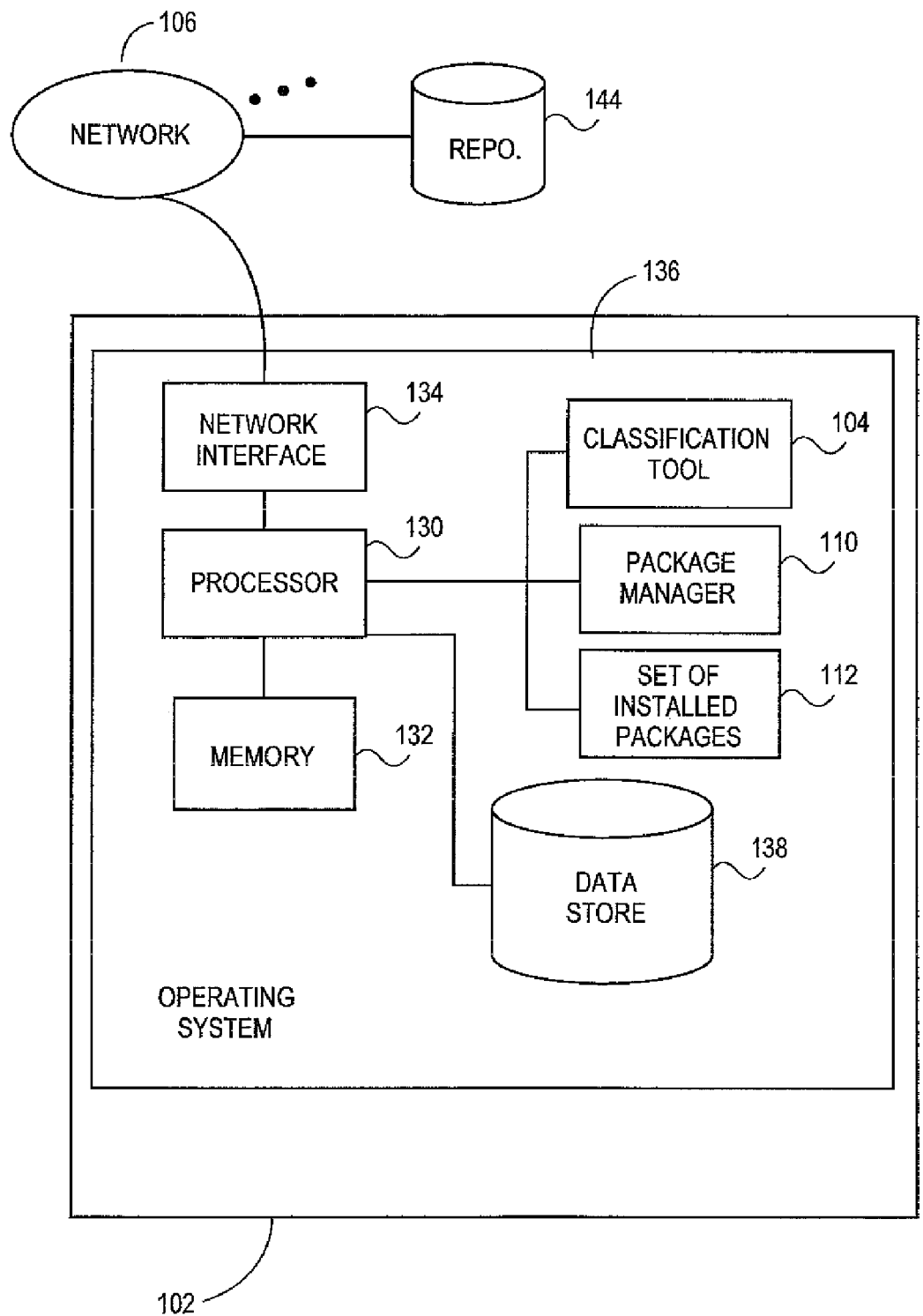
FIG. 3 illustrates exemplary hardware and other resources of a client machine that can be used in systems and methods for storing machine state history related to detected faults in the package update process, according to various embodiments.

FIG. 3 illustrates an exemplary diagram of hardware and other resources that can be incorporated in a client 102 configured to initiate, analyze, and/or test a set of installed packages 112 and other resources. As shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 can further communicate with a network interface 134, such as an Ethernet or wireless data connection, which in turn communicates with one or more networks 106, such as the Internet or other public or private networks. Processor 130 also communicates with classification tool 104, package manager 110, and/or other resources to execute control logic and control the updating, installation, analysis and management of software packages and their associated processes. Other configurations of client 102, including processor and memory resources, associated network connections, and other hardware and software resources are possible.

Figure 4:
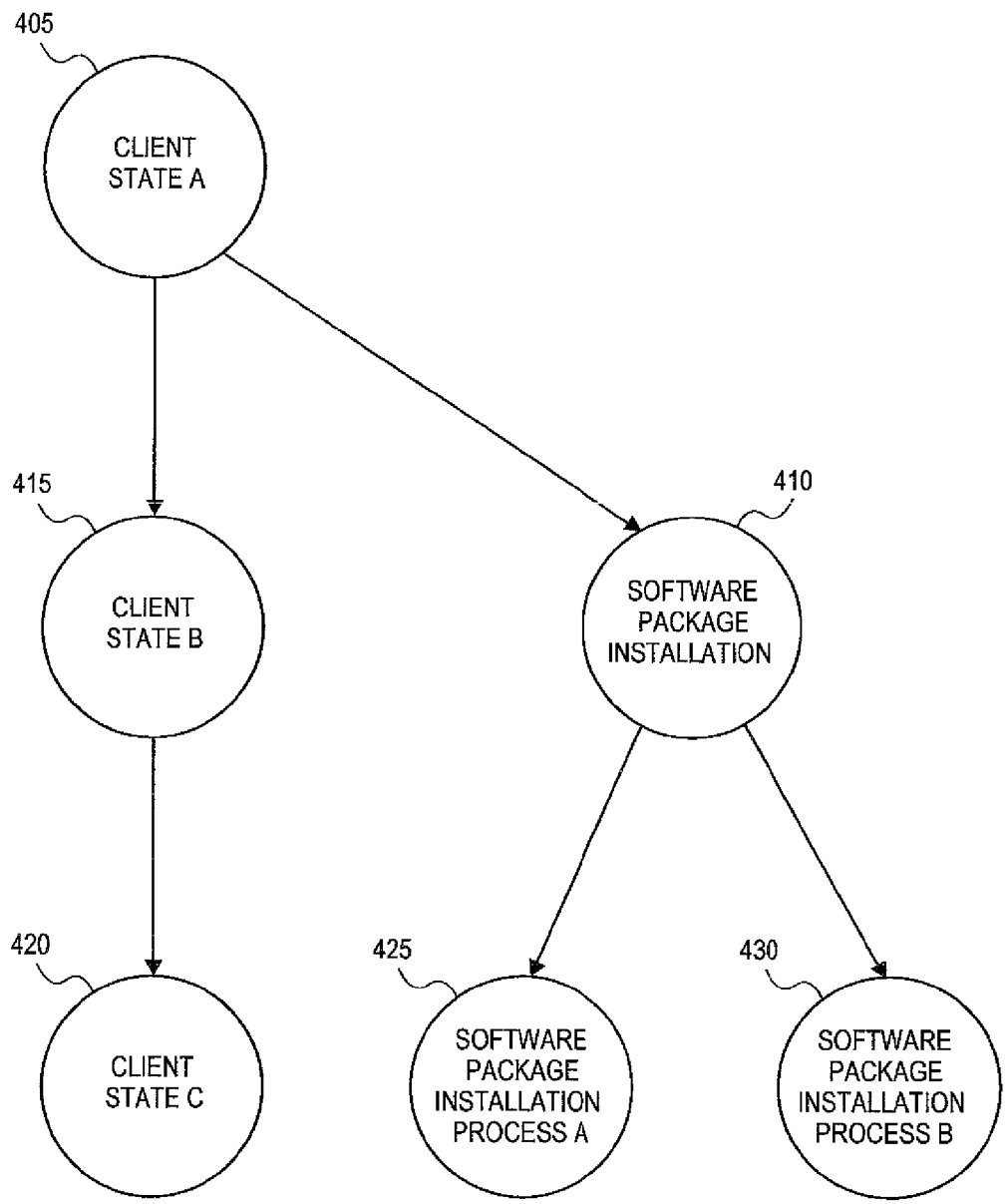
FIG. 4 illustrates an exemplary event tree that can result in systems and methods for storing machine state history related to detected faults in the package update process, according to various embodiments.

FIG. 4 illustrates an exemplary event tree during a software package installation. It should be appreciated that the event tree is merely exemplary and the corresponding nodes can represent different processes, application executions, or events. For example, node 405 can represent a process executing on client 102 before initiation of a software package installation. In another example, node 410 can represent an initiation of a software package installation, and nodes 415 and 420 can represent an iteration of the process represented by node 405 that can remain independent from the software package installation represented by node 410. Similarly, nodes 425 and 430 can be processes that are related to, that execute as a result of, or that otherwise depend from the software package installation represented by node 410.

As an illustration, if there is a fault condition at node 420, for example if a process represented by node 420 terminates, decision logic and/or a user can automatically or manually determine that the fault condition was not caused by the software package installation represented by node 410 because the process represented by node 420 does not depend from that of node 410. Further, the decision logic and/or the user can automatically or manually determine that the fault condition could have been caused by a systemic condition of client 102 because the process represented by node 420 depends from the process executing on client 102 before installation of a software package update, as represented by node 405. Similarly, if there is a second fault condition at node 425, for example if a process represented by node 420 terminates, decision logic and/or a user can automatically or manually determine that the second fault condition was caused by the software package installation represented by node 410 because the process represented by node 425 depends from that of node 410.

Figure 5:
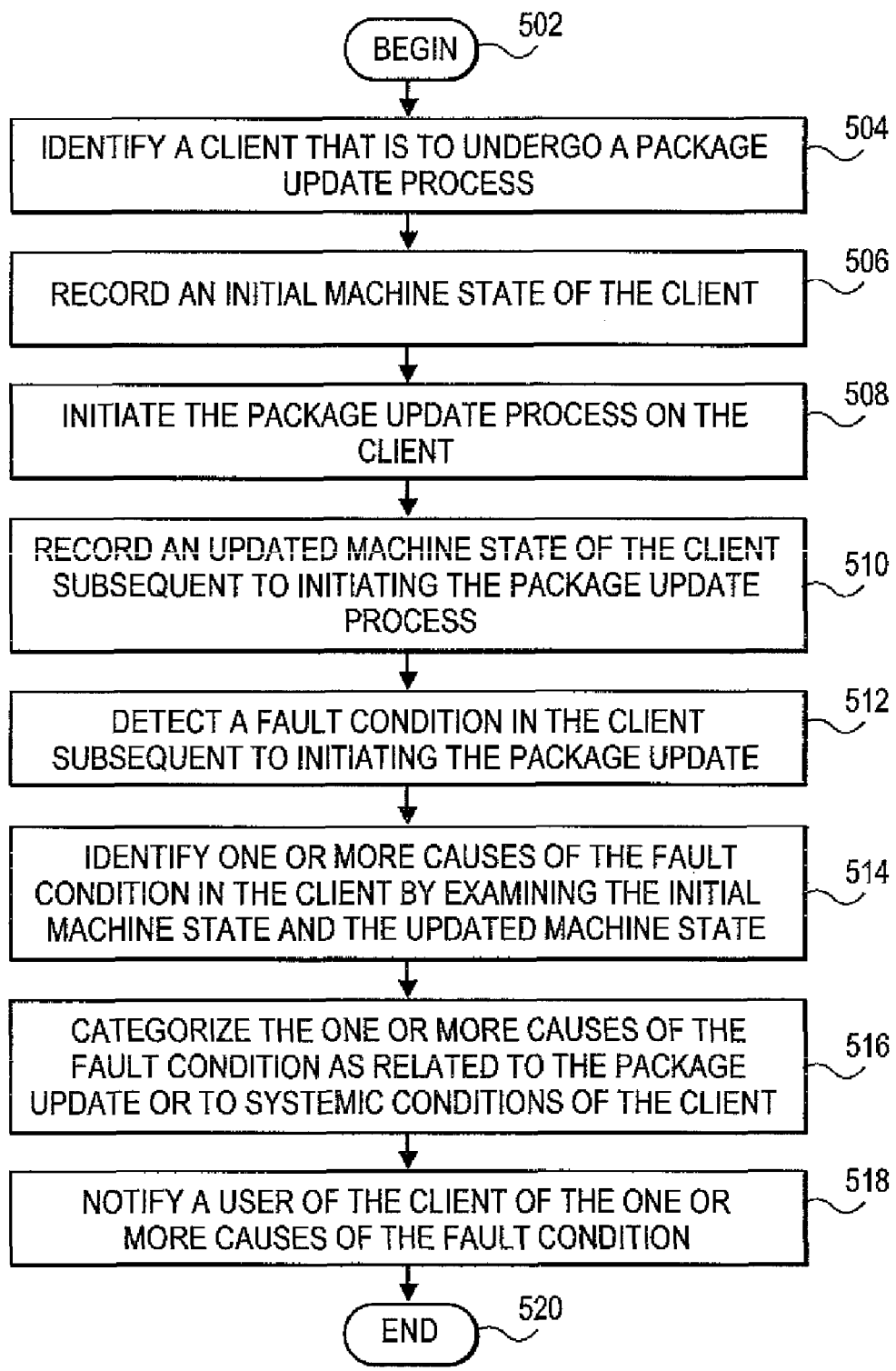
FIG. 5 illustrates a flowchart of software package update management and detection of system conditions that can be used in systems and methods for storing machine state history related to detected faults in the package update process, according to various embodiments.

FIG. 5 illustrates overall processing to track, monitor, manage, and/or diagnose software package updates and associated client system conditions, according to various embodiments. In 502, processing can begin. In 504, a client 102 that is to undergo a package update process can be identified. In 506, classification tool 104 and/or other logic can record an initial machine state of the client 102. In embodiments, classification tool 104 and/or other logic can record the initial machine state at one or more intervals over a set period of time, and can store associated data in a data store, event log, or similar storage such as diagnostic database 116. In embodiments, the initial machine state can be related to executing processes on the client 102, a memory state of the client 102, a processor state of the client 102, a communications state of the client 102, a storage state of the client 102, and/or similar conditions or states. In 508, a user can invoke or instantiate package manager 110 on client 102 to initiate package update processing or related activity.

In 510, classification tool 104 and/or other logic can record an updated machine state of the client 102 subsequent to the initiating of the package update. In embodiments, classification tool 104 and/or other logic can record the updated machine state at one or more intervals over a set period of time, and can store associated data in a data store, event log, or similar storage such as diagnostic database 116. In embodiments, the updated machine state can be related to executing processes on the client 102, a memory state of the client 102, a processor state of the client 102, a communications state of the client 102, a storage state of the client 102, and/or similar conditions or states. In 512, classification tool 104 and/or other logic can detect a fault condition in the client 102 subsequent to initiating the package update. In embodiments, the fault condition can be a crash or a termination of an application or other process executing on the client 102. In embodiments, classification tool 104 and/or other logic can detect the fault condition before, during, or after the package update process, and can store an indication of the fault condition in a data store, event log, or similar storage such as event log 154.

In 514, classification tool 104 and/or other logic can identify one or more causes of the fault condition in the client 102 by examining the initial machine state and the updated machine state. In embodiments, classification tool 104 and/or other logic can identify the one or more causes of the fault condition by examining data stored in a data store, event log, or similar storage such as diagnostic database 116. In 516, classification tool 104 and/or other logic can categorize the one or more causes of the fault condition as related to the package update or related to systemic conditions of client 102 by examining dependencies associated with the initial and updated machine states. For example, classification tool 104 can analyze an event tree of the initial and updated machine states 102 to decipher whether the fault condition was caused by the package update or by processes or applications on client 102 independent from the package update. In 518, classification tool 104 and/or other logic can notify a user of the client 102 of the one or more causes of the fault condition. In embodiments, classification tool 104 and/or other logic can notify the user via a user interface or over a network. In embodiments, a notification can be transmitted to a remote package server and/or stored locally on the client 102. In 520, processing can return to a prior processing point, jump to a further processing point, or end.

The foregoing description is illustrative, and variations in configuration and implementation may occur to persons skilled in the art. For example, while embodiments have been described in which a unitary package manager 110 is configured to control package update activity, in embodiments, multiple applications or software can interact to control the downloading, installation, testing, and other management of software packages. While embodiments have been described in which package update activity is conducted on one client 102, in other embodiments, multiple local or remote targets, clients, and/or other machines can register to package manager 110 and/or other logic or resources to receive or perform package update activity. Similarly, while embodiments have been described in which one diagnostic database 116 is accessed by classification tool 104, package manager 110, and/or other logic to identify causes of potential faults or issues, in other embodiments, multiple diagnostic or debugging databases can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
recording an initial machine state of a client;
initiating a package update on the client;
recording an updated machine state of the client subsequent to initiating the package update;
compiling the initial machine state and the updated machine state into an event tree;
detecting a fault condition in the client subsequent to initiating the package update; and
examining, by a processor, the initial machine state, the updated machine state, and one or more dependencies in the event tree to categorize one or more causes of the fault condition as either related to the package update or to a systemic condition of the client.

2. The method of claim 1, wherein the initial machine state and the updated machine state comprise one or more references to at least one of: one or more executing threads, one or more executing processes, one or more open communication ports, one or more dependencies, one or more authorized users, or one or more termination events.

3. The method of claim 1, wherein the initial machine state and the updated machine state are recorded at one or more intervals over a set period of time.

4. The method of claim 1, wherein the fault condition in the client comprises a crash or termination of an application or other process.

5. The method of claim 1, wherein the updated machine state is recorded during the package update.

6. The method of claim 1, wherein the updated machine state is recorded after completion of the package update.

7. The method of claim 1, wherein the systemic conditions of the client comprise conditions existing on the client prior to initiating the package update on the client.

8. The method of claim 1, wherein the user of the client is notified of the one or more causes of the fault condition via a user interface.

9. The method of claim 1, wherein the processor also examines at least one of: one or more executing threads, one or more executing processes, one or more open communication ports, one or more dependencies, one or more authorized users, or one or more termination events to categorize the one or more causes of the fault condition.

10. The method of claim 1, further comprising notifying a user of the client of the one or more causes of the fault condition.

11. A system comprising:
a memory; and
a processor coupled to the memory to:
store an initial machine state of a client in the memory;
initiate a package update on the client;
store an updated machine state of the client in the memory subsequent to initiating the package update;

compile the initial machine state and the updated machine state into an event tree;

detect a fault condition in the client subsequent to initiating the package update; and examine the initial machine state, the updated machine state, and one or more dependencies in the event tree to categorize one or more causes of the fault condition as either related to the package update or to a systemic condition of the client.

12. The system of claim 11, wherein the initial machine state and the updated machine state comprise one or more references to at least one of: one or more executing threads, one or more executing processes, one or more open communication ports, one or more dependencies, one or more authorized users, or one or more termination events.

13. The system of claim 11, wherein the initial machine state and the updated machine state are recorded at one or more intervals over a set period of time.

14. The system of claim 11, wherein the fault condition in the client comprises a crash or termination of an application or other process.

15. The system of claim 11, wherein the updated machine state is recorded during the package update.

16. The system of claim 11, wherein the updated machine state is recorded after completion of the package update.

17. The system of claim 11, wherein the systemic conditions of the client comprise conditions existing on the client prior to initiating the package update on the client.

18. The system of claim 11, wherein the user of the client is notified of the one or more causes of the fault condition via a user interface.

19. The system of claim 11, wherein the processor is also to examine at least one of: one or more executing threads, one or more executing processes, one or more open communication ports, one or more dependencies, one or more authorized users, or one or more termination events to categorize the one or more causes of the fault condition.

20. The system of claim 11, wherein the classification tool is further configured to notify a user of the client of the one or more causes of the fault condition.

\* \* \* \* \*